Dec. 2, 1941.   J. E. LOVELY   2,264,804
MACHINE TOOL
Filed Jan. 4, 1940   6 Sheets-Sheet 4
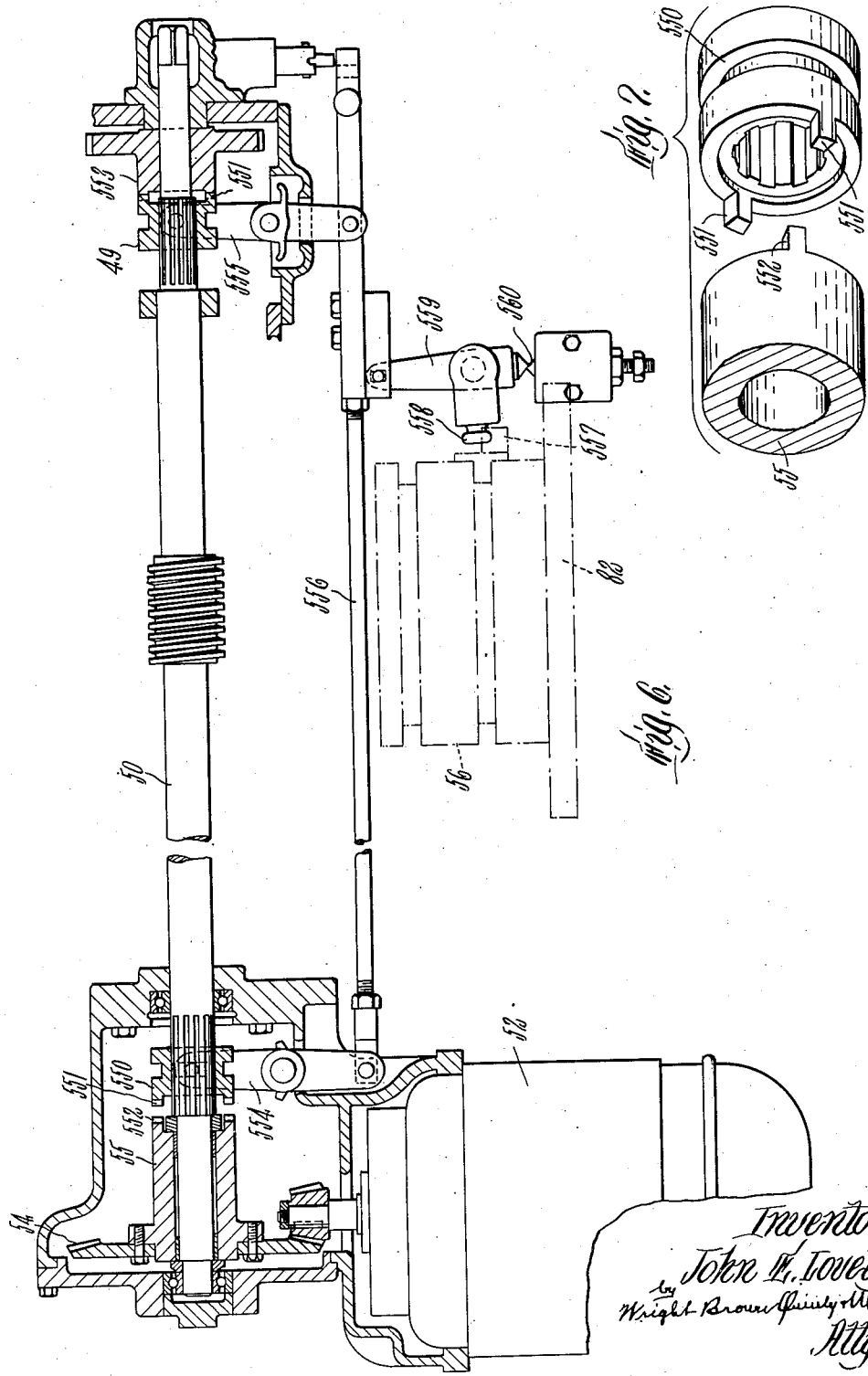
Inventor
John E. Lovely
by Wright, Brown, Quinby & May
Attys.

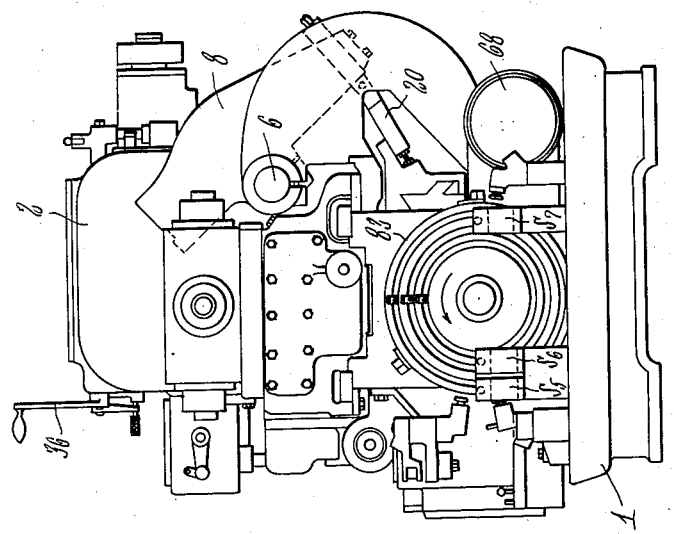
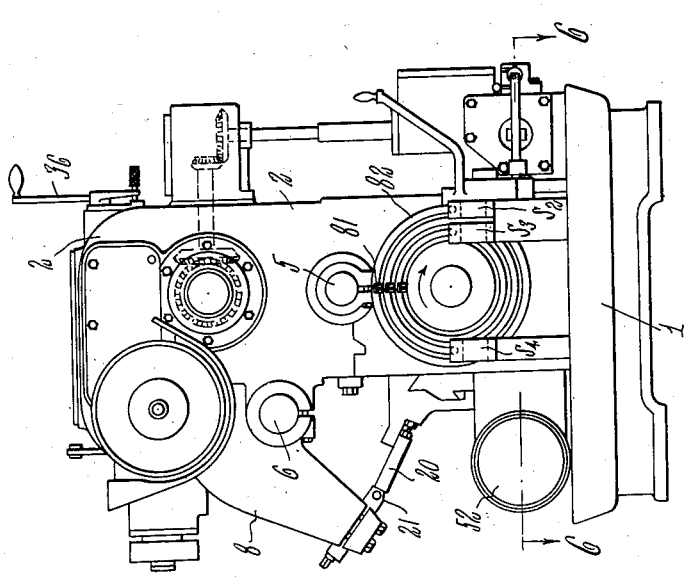

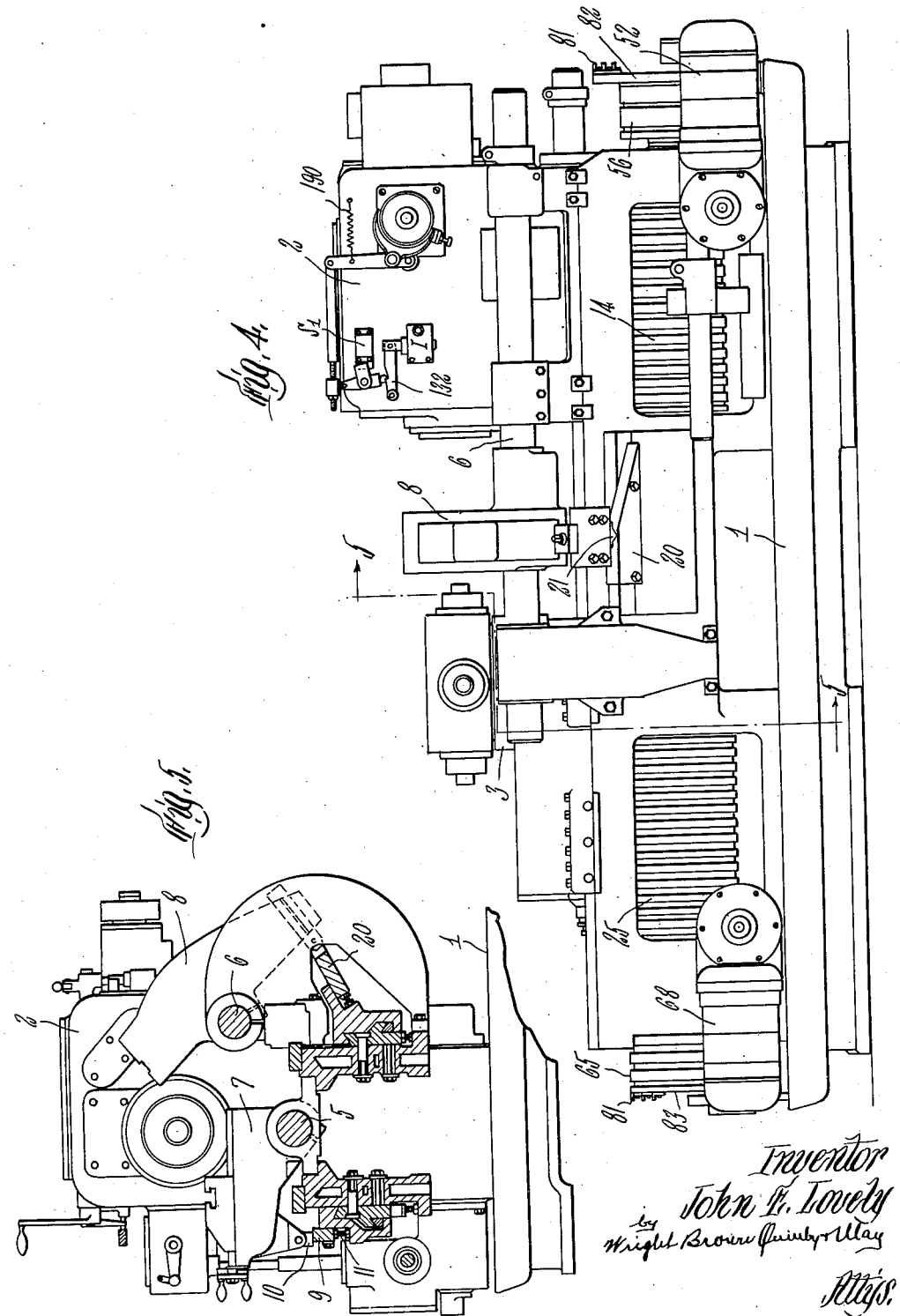

Dec. 2, 1941.                J. E. LOVELY                 2,264,804
                            MACHINE TOOL
                  Filed Jan. 4, 1940          6 Sheets-Sheet 5

Inventor
John E. Lovely
by Wright Brown Quinby May
Attys.

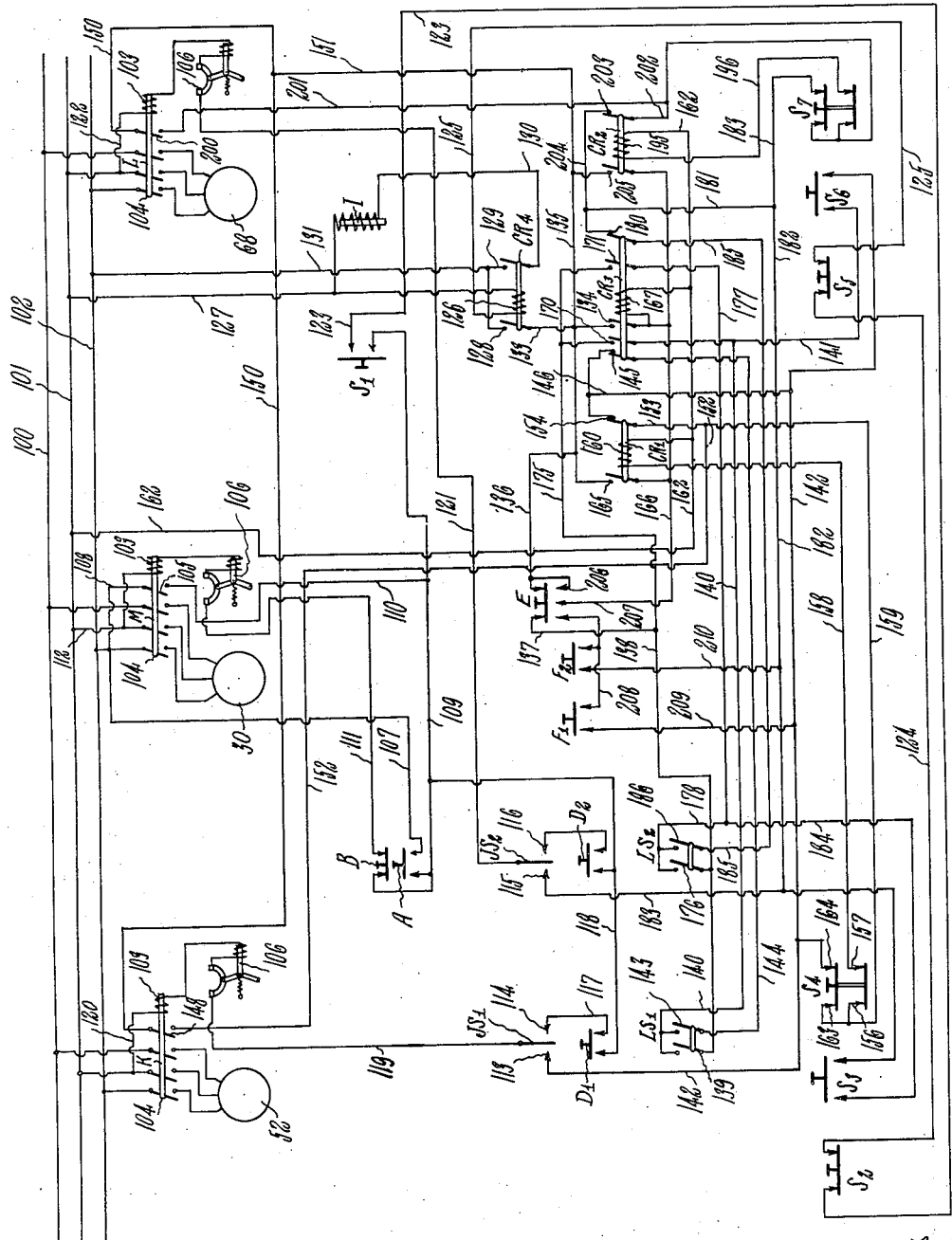

Patented Dec. 2, 1941

2,264,804

UNITED STATES PATENT OFFICE 2,264,804

MACHINE TOOL

John E. Lovely, Springfield, Vt., assignor to Jones & Lamson Machine Company, Springfield, Vt., a corporation of Vermont Application January 4, 1940, Serial No. 312,412

19 Claims. (Cl. 29—44)

This invention relates to machine tools and has for an object to provide for various controls possible with the machine tool illustrated in the Lovely and Knights Patents No. 2,065,816 granted December 29, 1936, but with a much simplified mechanism and which also makes possible other controls not possible in the patented machine.

A further object is to provide for power jogging actuation of the cam drums of the machine under the control of the operator which facilitates setting up of the machine for a work cycle.

To these ends and with further advantages, as will more fully appear, the controlling cam drums are individually motor driven at fast speed, thus avoiding the necessity of the fast speed mechanical drive connections between the cam drums shown in the patent and making possible electric switch control both automatic and manual as may be desired.

For a more complete understanding of this invention reference may be had to the accompanying drawings in which Figure 1 is a front elevation of a machine tool embodying the invention.

Figures 2 and 3 are left and right hand elevations, respectively, of the same.

Figure 4 is a rear elevation of the machine.

Figure 5 is a sectional view on line 5—5 of Figure 4.

Figure 6 is a detail section on line 6—6 of Figure 2.

Figure 7 is a fragmentary exploded perspective view of certain clutch parts shown in Figure 6.

Figure 9 is an electrical wiring diagram showing the various controls.

Figure 1:
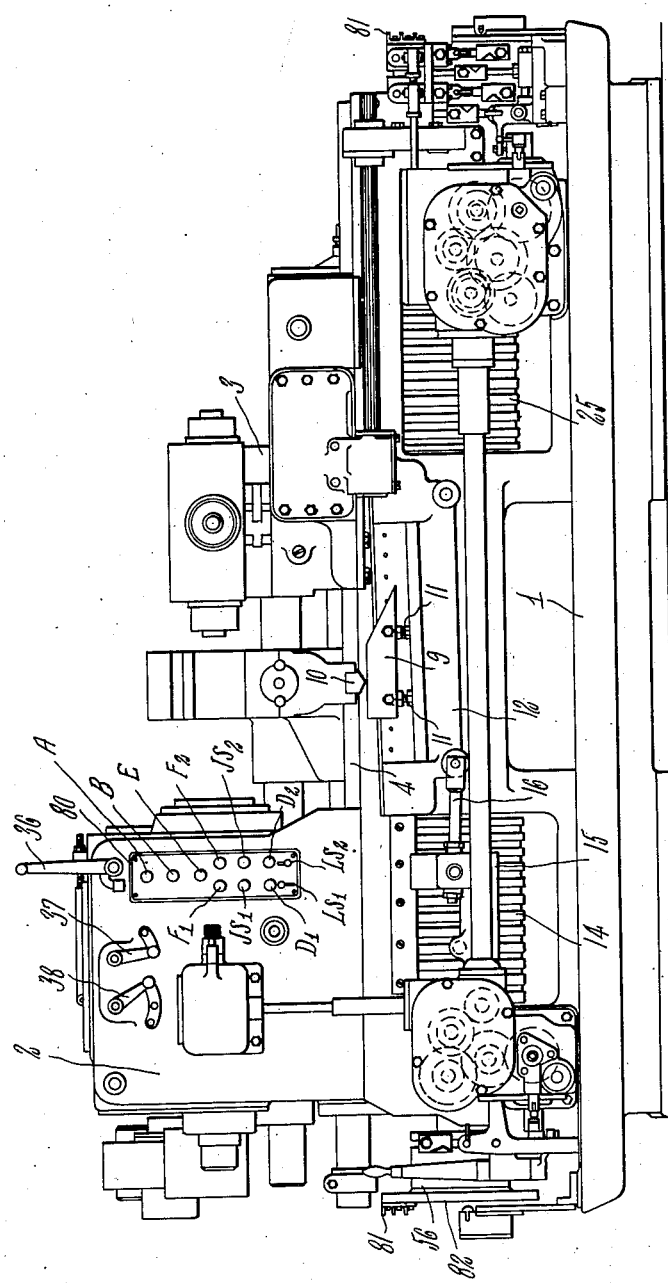

The machine shown is of the general construction illustrated in the Lovely et al. patent to which reference has already been made. It comprises a bed 1 having a headstock 2 and a turret carriage 3 which is movable on ways 4 toward and from the headstock. This machine is of the Fay type having the front and rear tool bars 5 and 6, respectively. The tool bar 5 supports the front tool carriage 7 and the back tool bar 6 supports the back tool-carrying arm 8. The angular position of the carriage 7 may be controlled by the former cam 9 upon which rides the follower 10 of the tool carriage 7. This former cam is angularly adjustable as on the adjusting screws 11 and is supported on a carriage 12 arranged for reciprocating motion and controlled by cams (not shown) on a headstock cam drum 14 through a slide 15 and a link connection 16 with the slide 12. Similarly the arm 8 has its angular position controlled by a back former cam 20 on which rides a follower 21 carried by the rear lower end of the arm 8.

Certain other controls of the machine are effected by cams (not shown) on a second cam drum 25 which is mounted within the base 1 beneath the turret slide. Details of the various controls from the cam drums may be as shown in the Lovely and Knights patent, and per se, form no part of the present invention.

As also shown in Figure 6 of that patent, the controlling cam drums are in axial alinement with each other but are entirely independent in their mounting and drive.

Figure 8:
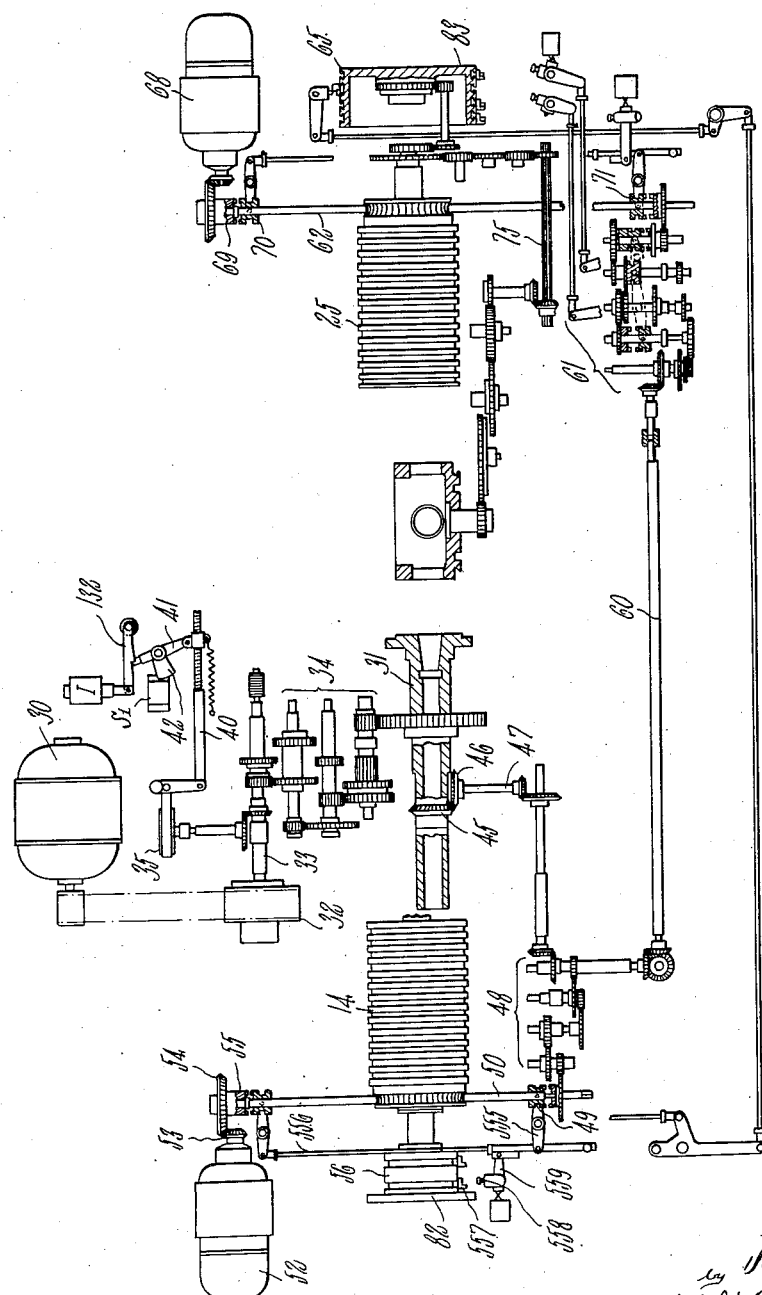
Figure 8 is a diagrammatic view of the driving mechanism.

Referring to Figure 8 of the drawings, at 30 is indicated a main motor which is connected to drive the work spindle 31, being shown as belt connected to the pulley 32 which corresponds to the driving pulley 20 of the Lovely and Knights patent. This pulley 32 is secured to a shaft 33 and there is a train of gearing shown as a whole at 34 between the shaft 33 and the work spindle 31. This train of gearing may be and is shown as that illustrated in Figure 32 of the Lovely and Knights patent. At 35 is shown a brake pulley connected to the drive mechanism in the same manner that the brake pulley 222 of the Lovely and Knights patent is connected. The various control handles 36, 37 and 38 correspond exactly with the handles 36, 43 and 66, respectively, of the Lovely and Knights patent, except that the handle 36 has an additional connection through the brake actuating linkage 40 with a rock arm 41 having an actuating cam 42 for closing a normally open two pole switch $S_1$, the purpose of which will later more fully appear.

As in the patented construction, the low speed drive for the cam drums 14 and 25 is derived from the rotation of the work spindle 31, the drive being taken from the bevel gear 45 on the work spindle to a bevel gear 46 carried by a shaft 47. From the shaft 47 the drive is identical with that shown in the patent, through the change gear mechanism indicated as a whole at 48 and the clutch 49 to the worm shaft 50 which drives the drum 14. The clutch-shifting mechanism for the low and high speed drive of this drum 14 may be substantially identical with that for driving the drum 110 of the patent, but the high speed drive for the worm shaft 50, instead of being through a gear train from the drive for the shaft 33, is derived from a high speed motor 52, the armature of which is connected through the intermeshing bevel gears 53 and 54 with the clutch element 55. The details of these drives are shown in Figures 6 and 7. The clutch elements 49 and 550 are slidable on splined portions of the shaft 50 and have clutch lugs 551 which may be moved into or out of driven relation to lugs 552 on the high and low speed driving clutch element 55 and 553, respectively, by shift levers 554 and 555 connected by a link 556 which is shifted by cam elements such as 557 engaging a follower 558 on a connecting lever 559 engaged by a load and fire cam 560 to insure complete throw in each direction. The selection and change from one to the other of the high and low speed drive for each cam mechanism is thus effected by cams on the same mechanism. Also rotatable with the cam drum 14 is the supplemental cam drum 56 similar to the cam drum 600 of the patent.

The slow speed drive for the drum 25 is produced in the same manner as shown in the patent, through the long shaft 60, and the change gear mechanism 61, to the right hand drum worm shaft 62. The supplemental cam drum 65 is also driven from the cam drum 25 in the same manner as the supplemental cam drum 605 of the patent.

The high speed drive of the right hand cam drum 25 and the supplemental drum 65, instead of being derived from the main shaft 33, as in the patent, is derived from a second high speed motor 68 which drives the clutch element 69, which may be made effective to drive the cam drum by shifting the clutch element 70 into engagement therewith which disconnects the low speed drive mechanism of the clutch 71. The details of this drive may be the same as shown in Figures 6 and 7. The turret mechanism may also be driven in the same manner as shown in the patent from a splined shaft 75 corresponding to the shaft 457 of the patent.

The various cam controls derived from the cam drums 14 and 25 may be identical to those from the drums 110 and 111 of the patent, as may also be the controls from the high and low speed drives to the supplementary cam drums 56 and 65 corresponding to the supplemental cam drums 60 and 605, respectively, of the patent.

The mechanical controls for the high speed drive shown in the patent, however, are eliminated and in place thereof are positioned electrical controls, certain being actuated by the supplementary cam drums and certain being operator-controlled and carried by a control board 80, which as shown in Figure 1, may be positioned on the forward face of the headstock 2 in convenient position for the operator.

The automatic controls comprise switch throwing lugs as 81 removably secured to end face members 82 and 83 of the supplementary cam drums 56 and 65, respectively. The switches actuated by the elements 81 on the left hand supplementary cam drum 56 are the stop switch S4 for the left hand drum fast motion motor, the normally open starting switch S3 for the right hand fast motion motor 68, and the normally closed starter lever release switch S2. The switches actuated by the lugs 81 on the supplementary drum 65 are the normally closed starter lever release switch S5, the normally open starting switch S6 for the left hand fast motion motor 52, and the stop switch S7 for the right hand fast motion motor 52. It will be noted that there is an intercontrol between the cam mechanism, rotation of one cam drum serving to start the rotation of the other before it stops itself.

On the switch board 80 are positioned the following switches: the main motor push button starting switch A, the master stop push button switch B, the jog selectors $JS_1$ and $JS_2$ for the left and right hand fast motion motors 52 and 68, respectively, jog push buttons $D_1$ and $D_2$ for these same fast motion motors, respectively, the lead selector switches $LS_1$ and $LS_2$ for these same motors, respectively, the restart push button E, the start push buttons $F_1$ and $F_2$ for the left and right hand fast motion motors, respectively.

Beside these controls on the panel 80 and the automatic controls actuated by the contacts 81 on the supplementary cam drums, there are other controls as follows: A starter lever contact switch $S_1$, a magnetic starter M for the main motor 30, and magnetic motor starters K and L for the left and right hand fast motion motors 52 and 68, respectively, and four control relays $CR_1$, $CR_2$, $CR_3$ and $CR_4$.

The wiring diagram of these various controls is shown in Figure 9. The motors 30, 52 and 68 are shown as of a three phase type, deriving their energy from the power lines 100, 101 and 102. The magnetic starter for each of these motors comprises the closing coil 103, which, besides closing the corresponding three pole switch 104, also closes a holding circuit switch 105, 148, or 200 and the coil 103 is also connected to the overload circuit breaker 106. The starter push button A is connected through the lead 107 with the power line 102 and also through the leads 107 and 108 with the holding switch 105 for the motor 30. The opposite side of the switch A is connected through the leads 109 and 110 with the opposite side of the holding switch 105. It is also connected through the normally closed stop push button B through the lead 111 and the overload switch 106 with the magnet coil 103 and back through the lead 112 to line wire 101. Thus when the push button A is closed, the main motor 30 is started into operation, and the closing of the switch 105 holds the magnetic switch M closed so that the main motor 30 remains connected even on release of the starter push button A, but may be stopped by opening the stop push button at B. The main motor thus being running, the normally opened switch $S_1$ is closed by moving the starter lever 36 to running position (see Figure 8), this movement of the lever 36 moving the switch actuator 42 into switch-closing position. It is only when the main motor is running that the fast motion motors 52 and 68 may be actuated, and stopping of the motor 30 by a depression of the stop push button B will also cause the fast motion motors 52 and 68 to stop, if they happen to be running at that time.

The closing of the switch $S_1$ conditions the controls for operation of the fast motion motors 52 and 68, either in normal running relation, or so that they may be "jogged." "Jogging" comprises a drive of the motor so long as a jog control push button is depressed, removal of pressure immediately causing this motor to stop. In the normal running control the motor is out of control of the jog push button. The jog selector switch for the left hand motor 52 is shown at $JS_1$ and may be moved selectively into contact with either the running contact 113 or the jogging contact 114. Similarly the jog selector for the motor 68, $JS_2$, may be moved selectively into engagement with the running contact 115 or the jogging contact 116. The jogging contact 114 is connected through the lead 117 with the normally open jog push button D₁, and through this and the lead 118 to the lead 109. The switch JS₁ is connected through the lead 119 with the overload relay 106 for the left hand motor 52, its switch-closing coil 103, and through the lead 120 to the line wire 101, so that when the jogging switch JS₁ is in jog position and the push button D₁ is depressed, the magnetic switch K is closed, so that the left hand motor 52 is driven. This condition persists so long as the jog switch D₁ is closed, but immediately upon release of it, the motor 52 stops.

Similarly the depression of the push button D₂ when the jog selector JS₂ engages the contact 116, will cause jogging rotation of the right hand motor 68, the lead 118 connecting through the jog push button D₂, the contact 116, the jog selector switch, the lead 121, the right hand motor overload relay, its closing magnet 103, and back through the lead 122 to the power line 101. When the jog selector switches JS₁ and JS₂ are in their running position in engagement with the contacts 113 and 115, respectively, and the switch S₁ is closed by the positioning of the control lever 36 in running position, the motors 52 and 68 are controlled in their normal running relations. In these positions of the parts, the switch 105 provides a connection from the line 102, line 108, line 110, line 109, switch S₁, line 123, the normally closed switch S₂, the lead 124, the normally closed switch S₅, the lead 125, the magnet coil 126 of the relay CR₄ and the lead 127, back to the power line 101. This closes the normally open contacts 128 and 129 of the relay CR₄. The closing of the contact 129 closes a circuit from the lead 127 through the latching coil I and the lead 130 to the lead 131 to the power line 102.

The energization of the coil I actuates a latch 132 (see Figures 4 and 8) which engages and holds the lever 41, and consequently the starting lever 36 in running position. The starter lever 36 and its switch S₁ thus remain closed until one or more of the switches S₂ or S₅ opens. The other contact 128 provides a connection through the lead 133 to the normally open switch 134 of the relay CR₃. This lead 133 also connects through the leads 135 and 136 to normally closed switch E, leads 137 and 138 to the pole 139 of LS₁, and if this switch is closed, through the leads 140 and 141 to the switch S₆ and if this is closed, through the lead 142, the running contact 113 of the jog switch JS₁, through the lead 119, and the overload relay 106 for the left hand motor 52, and back to the power line 101. If the switch S₆ is open and the selector switch LS₁ is closed, connection is made through the second pole 143 of this switch, the lead 144, the normally closed contact 145 of the relay CR₃, the lead 146 to the lead 142, which carries back to the same jog contact 113. Completion of this circuit causes the magnetic starter K to close and starts the left hand fast motion motor 52. Closing of the starter K causes the normally open auxiliary switch 148 to close, which establishes a maintaining circuit for the magnetic starting switch K through the leads 150, 151 and 133 through the normally open contacts 128, which is now closed, back to the line 131 and the power line 102. The opposite side of the switch 148 connects through the lead 152 and 153 through the normally closed contact 154 of the relay CR₁ to the lead 146. At this time the relay CR₁ is de-energized if the stop switch S₄ is open, but is immediately energized through the contacts 156 and 157, leads 158 and 159, if the switch S₄ is closed. The lead 158 goes to the coil 160 of the relay CR₁, the opposite side of which connects through the lead 162 to the power line 101. Thus the maintaining circuit for the magnetic switch K through the switch 148 is continued through the lead 152 of the relay CR₁, if the stop switch S₄ is open, and continues through the switch S₄; if it is closed, through the contacts 162 and 164, thence through lead 142, the jog selector contact 113 and the overload relay 106 of the motor 52 to the line 101.

While the left hand fast motor starter K is being closed and remains closed, as thus described, the right hand fast motor starter L remains de-energized, the contacts of the lead selector LS₂ being open and the control relay CR₃ having not yet operated. This condition prevails regardless of the control drum operated starter and stop switches S₃ and S₇. The lead selector switches thus control completely the sequence in which the fast motion motors start a new work cycle.

When the control relay CR₁ is energized, its normally closed contact 154 opens and its normally open contact 165 closes, completing the connection from the line 135 through the contact 165, the lead 166, the coil 167 of the relay CR₃, back to the lead 162, so that relay CR₃ closes, thus opening the normally closed contact at 145 and closing three normally open contacts 134, 170 and 171.

The closing of the normally open contact 134 establishes a maintaining circuit for the coil 167 of the relay CR₃ from the line 101 through the lead 162, contact 134, lead 133, contact 128 of the relay CR₄ and lead 131 to the line 102, which thus renders the relay CR₃ independent of all control devices except the relay CR₄. The closing of the normally open contact 170 of the relay CR₃ establishes a by-pass circuit around one pole of the lead selector LS₁, since this closes connections from a lead 175 connecting to the lead 141 which connects through the lead 140. The closing of the relay contact 171 establishes a by-pass circuit around one pole 176 of the lead selector LS₂ since it connects from the lead 175 to the lead 177 and the lead 178. The closing of the relay CR₃ also opens a normally closed contact at 180, opening a by-pass circuit around the start switch S₃ through the leads 181, 182, which connect with the start switch S₃, through lead 183, and the lead 185, the pole 186 of the switch LS₂, and the lead 184 which goes to the other side of the start switch S₃. Thus the control relay CR₃ renders completely ineffective both of the lead selector switches LS₁, and LS₂ for the remainder of the work cycle. Thereafter until the machine is automatically stopped through action of the control drum operated starting lever release switches S₂ and S₅ the fast motion motors are started and stopped in a sequence determined by the setting of the lugs operating the start and stop switches S₃, S₄, S₆, and S₇. These lugs are so set that before either of the cam drums actuating these switches stops, it insures the actuation of the other, in order that the automatic control may be continuous throughout the work cycle. At the end of the work cycle one or the other control drum operated starter release switches S₂ or S₅ is mechanically opened thus causing the control relay CR₄ to become de-energized and open and remain open. This action, in turn, de-energizes the starter lever release solenoid I, causing the starter lever to return to the off position to which it is urged by the spring 190 (see Figure 4) and also de-energizes the magnetic coil circuits of the fast motion motor starters K and L and all the control relays. Thus both fast motion motors 52 and 68 stop and the control relays are returned to the normal positions shown in the diagram of Figure 9. The main motor 30, however continues to run.

The next work cycle may then be started in the manner heretofore described with the lead selectors LS₁ and LS₂ once more effective.

If the lead selector LS₂ is closed to cause the right hand fast motion motor 68 to start the new cycle and the lead selector LS₁ is open, the action is the same as above described, except that the control relay CR₃ will be closed through contacts of the control relay CR₂ which corresponds in all its functions to the control relay CR₁. Thus the closing of the lead selector LS₂ completes a circuit from the line 101 through the magnetic coil 103 of the motor starter L, the overload relay 106, the lead 121, the jog selector contact 115, lines 183, 182 and 181, the normally closed contact 180, lead 185, the switch arms 186, 176 and back to the line 138, line 137, the normally closed switch E, the leads 136 and 135 through the contact 128 of the closed relay CR₄ and the lead 131 to the line 102.

The stop switch S₇ being closed, the coil 195 of the relay CR₂ is energized through the lead 162 coming from the line 101, through the line 196, the stop switch S₇, line 183, jog selector running contact 115, lead 121, and the overload switch 106 and holding coil 103 of the right hand motor 68 which starts the rotation of this motor. Closing of the starter L for this motor closes the normally open auxiliary switch 200 which establishes a maintaining circuit for the magnetic starting switch L through the leads 150, 151 and 133, through the normally open but now closed contact 128 back to the line 131 and the power line 102. The opposite side of the switch 200 connects through the leads 201 and 202, through the normally closed contact 203 of the relay CR₂, through the lead 204, the leads 181 and 183, closed stop switch S₇, coil 195 and lead 162 to line wire 101. The energization of the relay CR₂ through the coil 195 closes the normally open contact 205 which immediately energizes the coil 167 of the relay CR₃ from the lead 166, closing to the lead 151, so that the relay CR₃ is then closed, whereas when the lead selector LS₁ was first closed, this relay CR₃ remained open. The action of the relay CR₃ is thus reversed from its former condition so that the right hand motor 68 now starts the cycle.

In the event of the stopping of the machine before completion of the work cycle through voltage failure, tripping of an overload relay, or pressing of the master stop button, the cycle may be resumed by the following operations. First, the main motor 30 must be started by pressing the main motor start button A. Then re-start push button E must be depressed and held depressed while the starting lever 36 is engaged, this operation closing the relay CR₄ and establishing a circuit from line 102 through lead 131 through its normally open contact 128 through leads 133, 136, and normally open contacts 206 and 207 of the button E, lead 166, coil 167 of relay CR₃, lead 162 to line 101. Thus relay CR₃ closes rendering ineffective the existing setting of lead selectors LS₁ and LS₂.

The parts are now so conditioned that by holding the restart button E depressed, either selected of the motors 52 or 68 may be started by depressing the corresponding start push buttons F₁ or F₂ which connects from the restart contact 207 through the leads 208 and 209 or 210 to the leads 142 or 182 through the corresponding running contacts 113 or 115 and the respective starter coils 103 of the motor starters K or L back to the line 101.

From the foregoing description of an embodiment of this invention, it should be evident to those skilled in the art that various changes and modifications might be made without departing from the spirit or scope of this invention as defined by the appended claims.

I claim:

1. A machine tool comprising work and tool holders, means including a pair of cam mechanisms for actuating and controlling said holders to perform a work cycle, means including a separate motor for driving each cam mechanism, switches controlled by cams of said mechanisms for controlling said motors, and operator-actuated switches for controlling said motors independently of said cam actuated switches.

2. A machine tool comprising work and tool holders, means including a pair of cam mechanisms for actuating and controlling said holders to perform a work cycle, means including a separate motor for driving each cam mechanism, switches controlled by cams of said mechanisms for controlling said motors, operator-actuated means for selecting one of said cam mechanisms to initiate the work cycle, and means for starting the operation of said machine tool.

3. A machine tool comprising work and tool holders, means including a pair of cam mechanisms for actuating and controlling said holders to perform a work cycle, means including a separate motor for driving each cam mechanism, switches controlled by cams of said mechanisms for controlling said motors, operator-actuated jog switches for each cam mechanisms, and means for selectively rendering the cam control switches operative or inoperative and said jog switches ineffective or effective, respectively, when actuated.

4. A machine tool comprising work and tool holders, means including a pair of mechanisms for actuating and controlling said holders to perform a work cycle, said mechanisms being arranged each to partly control the other, means including a separate motor for driving each mechanism, switch means for controlling said motors, and operator-actuated means for selecting one or the other of said mechanisms to initiate said work cycle.

5. A machine tool comprising work and tool holders, means including a pair of mechanisms for actuating and controlling said holders to perform a work cycle, one of said holders comprising a rotary spindle, means for driving said spindle, a drive for said mechanisms from said spindle, a motor for driving each mechanism, means operated by said mechanisms for selecting the drive from said spindle or from one or the other of said motors, and operator-actuable means for starting operation of said machine tool.

6. A machine tool comprising work and tool holders, means including a pair of mechanisms for actuating and controlling said holders to perform a work cycle, one of said holders comprising a rotary spindle, means for driving said spindle, a low speed drive for said mechanisms from said spindle, a motor for driving each mechanism at a higher speed, means operated by said mechanisms for selecting the drive from said spindle or from one or the other of said motors, and operator-actuable means for starting operation of said machine tool.

7. A machine tool comprising work and tool holders, means including a pair of mechanisms for actuating and controlling said holders to perform a work cycle, one of said holders comprising a rotary spindle, means for driving said spindle, a drive for said mechanisms from said spindle, a motor for driving each mechanism, means operated by said mechanisms for selecting the drive from said spindle or from one or the other of said motors, operator-actuable means for selecting which of said mechanisms shall start said work cycle, and operator-actuable means for starting the operation of said machine tool.

8. A machine tool comprising work and tool holders, means including a pair of mechanisms for actuating and controlling said holders to perform a work cycle, a motor for driving each of said mechanisms, other means for driving said mechanisms, said mechanisms including means for selecting either said motor drive or said other drive, interconnecting controls between said motors and mechanism for insuring operation of at least one of said mechanisms at all times during said work cycle, and operator-actuable means for selecting that motor which shall be operating at the start of said work cycle.

9. A machine tool comprising work and tool holders, one of said holders including a rotary spindle, means for rotating said spindle, means including a pair of mechanisms for actuating and controlling said holders to perform a work cycle, a plurality of means for actuating said mechanisms, one of said actuating means being in driven relation to said spindle-rotating means, other means for actuating each of said pair of mechanisms, said mechanisms including means for selecting and changing from one to the other of said actuating means, and means for preventing operation of said other actuating means unless said rotating means is in operation.

10. A machine tool comprising work and tool holders, one of said holders including a rotary spindle, means for rotating said spindle, means including a pair of mechanisms for actuating and controlling said holders to perform a work cycle, a plurality of means for actuating said mechanisms, one of said actuating means being in driven relation to said spindle-rotating means, other means for actuating each of said pair of mechanisms, said mechanisms including means for selecting and changing from one to the other of said actuating means, means for preventing operation of said other actuating means unless said rotating means is in operation, and operator-actuable means for selecting which of said mechanisms shall be first actuated on the start of a work cycle.

11. A machine tool comprising work and tool holders, one of said holders including a rotary spindle, means for rotating said spindle, means including a pair of mechanisms for actuating and controlling said holders to perform a work cycle, a plurality of means for actuating said mechanisms, one of said actuating means being in driven relation to said spindle-rotating means, and another of said actuating means comprising a motor for driving each of said mechanisms, said mechanisms including means for selecting and changing between its respective motor and said spindle-rotating driven means, each of said mechanisms including means for stopping its own actuation, means insuring the actuation of one or the other of said mechanisms during a complete work cycle, and operator-actuable means for selecting the mechanism actuable at the beginning of each work cycle.

12. A machine tool comprising work and tool holders, one of said holders including a rotary spindle, means for rotating said spindle, means including a pair of mechanisms for actuating and controlling said holders to perform a work cycle, a plurality of means for actuating said mechanisms, one of said actuating means being in driven relation to said spindle-rotating means, and another of said actuating means comprising a motor for driving each of said mechanisms, said mechanisms including means for selecting and changing between its respective motor and said spindle-rotating driven means, each of said mechanisms including means for stopping its own actuation, means insuring the actuation of one or the other of said mechanisms during a complete work cycle, operator-actuable means for selecting the mechanism actuable at the beginning of each work cycle, and means preventing the operation of either of said mechanisms until after said spindle-rotating means has been started.

13. A machine tool comprising a rotary work-holding spindle, means for rotating said spindle, tool holders, means for moving said tool holders relative to said spindle to cause tools on said tool holders to operate on work on said spindle in a predetermined work cycle, said means including a pair of mechanisms, slow driving means for said mechanisms derived from said spindle-rotating means, a motor for driving each of said mechanisms at a higher speed, said mechanisms including means for selecting and shifting from one of said driving means to the other driving means, and switches for controlling said motors including means for selecting the motor for operation at the start of each work cycle and for starting one motor from the mechanisms driven by the other motor.

14. A machine tool comprising a rotary work-holding spindle, means for rotating said spindle, tool holders, means for moving said tool holders relative to said spindle to cause tools on said tool holders to operate on work on said spindle in a predetermined work cycle, said means including a pair of mechanisms, slow driving means for said mechanisms derived from said spindle-rotating means, a motor for driving each of said mechanisms at a higher speed, said mechanisms including means for selecting and shifting from one of said driving means to the other driving means, and switches for controlling said motors including means for selecting the motor for operation at the start of each work cycle, for starting one motor from the mechanism driven by the other motor, and for stopping each motor from the mechanism driven thereby.

15. A machine tool comprising work and tool holders including a spindle, means for rotating said spindle, means for moving said holders relatively to perform a work cycle, said moving means including a pair of motors, means for starting and stopping the rotation of said spindle, operator actuable means conditioned by said starting and stopping means to start the rotation of said spindle and means for causing rotation of one or the other of said motors only when said spindle is rotating.

16. A machine tool comprising work and tool holders including a spindle, means for rotating said spindle, means for moving said holders relatively to perform a work cycle, said moving means including a pair of motors, means for starting and stopping the rotation of said spindle, means for causing rotation of one or the other of said motors only when said spindle is rotating, and means for selecting the motor operating at the start of a work cycle.

17. A machine tool comprising work and tool holders including a spindle, means for rotating said spindle, means for moving said holders relatively to perform a work cycle, said moving means including a pair of motors, means for starting and stopping the rotation of said spindle, means for causing rotation of one or the other of said motors only when said spindle is rotating, means for selecting the motor operating at the start of a work cycle, means for stopping the machine tool, and means for re-starting the machine tool out of control of said selecting means.

18. A machine tool comprising work and tool holders including a rotary spindle, means for rotating said spindle, means including a plurality of motors for moving said holders relatively in a manner to perform a work cycle, means for starting the rotation of said spindle, a cycle control movable between an operative and an inoperative position and biased to inoperative position, means effective only when said spindle is rotating to retain said cycle control in operative position, and means effective only when said cycle control is in operative position and said spindle is rotating to cause said holder moving means to operate to cause the performance of said work cycle.

19. A machine tool comprising work and tool holders, means including mechanism for actuating and controlling said holders to perform a work cycle, one of said holders including a rotary shaft, a motor for rotating said shaft, a magnetic switch having a holding circuit for controlling said motor, means including a second motor for driving said mechanism, and an actuating circuit for controlling said second motor connected to said holding circuit to permit actuation of said second motor only when said holding circuit is closed.

JOHN E. LOVELY.